(12) United States Patent
Terasaka et al.

(10) Patent No.: US 11,511,714 B2
(45) Date of Patent: Nov. 29, 2022

(54) VEHICLE BRAKING CONTROL DEVICE

(71) Applicant: ADVICS CO., LTD., Kariya (JP)

(72) Inventors: Masato Terasaka, Kariya (JP); Chisa Kitahara, Kariya (JP)

(73) Assignee: ADVICS CO., LTD., Kariya (JP)

( * ) Notice: Subject to any disclaimer, the term of this patent is extended or adjusted under 35 U.S.C. 154(b) by 245 days.

(21) Appl. No.: 16/756,266

(22) PCT Filed: Oct. 25, 2018

(86) PCT No.: PCT/JP2018/039575
§ 371 (c)(1),
(2) Date: Apr. 15, 2020

(87) PCT Pub. No.: WO2019/082947
PCT Pub. Date: May 2, 2019

(65) Prior Publication Data
US 2020/0317174 A1    Oct. 8, 2020

(30) Foreign Application Priority Data

Oct. 25, 2017    (JP) .............................. JP2017-205769

(51) Int. Cl.
*H02P 3/00*        (2006.01)
*B60T 8/00*        (2006.01)
(Continued)

(52) U.S. Cl.
CPC ............ *B60T 8/1761* (2013.01); *B60T 8/321* (2013.01); *B60T 8/52* (2013.01); *B60T 8/86* (2013.01)

(58) Field of Classification Search
None
See application file for complete search history.

(56) References Cited

U.S. PATENT DOCUMENTS

2002/0044047 A1*  4/2002  Miyakoshi ............. G08G 1/161
                                                          340/435
2005/0046368 A1*  3/2005  Arakawa ............... B60T 13/741
                                                          318/370

FOREIGN PATENT DOCUMENTS

JP    H10-313592 A    11/1998
JP    2002-067845 A    3/2002

OTHER PUBLICATIONS

International Search Report (PCT/ISA/210) dated Jan. 29, 2019, by the Jaopanese Patent Office as the International Searching Authority for International Application No. PCT/JP2018/039575.
(Continued)

*Primary Examiner* — Adam D Tissot
(74) *Attorney, Agent, or Firm* — Buchanan Ingersoll & Rooney PC

(57) ABSTRACT

This vehicle braking control device executes automatic braking control to adjust a braking torque on the basis of a vehicle target deceleration value corresponding to a distance between the vehicle and an object in front of the vehicle, and executes anti-skid control to suppress excessive wheel slip by adjusting the braking torque on the basis of a wheel speed. The braking control device calculates an actual deceleration value corresponding to the target deceleration value, and executes feedback control on the basis of the target deceleration value and the actual deceleration value such that the actual deceleration value approaches the target deceleration value. The configuration is such that a control gain of the feedback control is reduced when anti-skid control is executed. Further, the configuration may be such that execution of feedback control is prohibited when anti-skid control is executed.

2 Claims, 7 Drawing Sheets

(51) Int. Cl.
*B60T 8/58* (2006.01)
*B60Q 1/00* (2006.01)
*B60T 8/1761* (2006.01)
*B60T 8/32* (2006.01)
*B60T 8/52* (2006.01)
*B60T 8/86* (2006.01)

(56) References Cited

OTHER PUBLICATIONS

Written Opinion (PCT/ISA/237) dated Jan. 29, 2019, by the Jaopanese Patent Office as the International Searching Authority for International Application No. PCT/JP2018/039575.

\* cited by examiner

VEHICLE BRAKING CONTROL DEVICE

TECHNICAL FIELD

The present invention relates to a vehicle braking control device.

BACKGROUND ART

Patent Literature 1 describes, with the purpose of "preventing the actual deceleration of the vehicle from overshooting above the target deceleration by pressure increase of the brake force when an anti-skid brake device (ABS) is operated during operation of an automatic braking device, and thereafter, the operation of the ABS is ended", "providing the vehicle with an automatic braking device that automatically applies brake of each wheel under a predetermined condition and an ABS that suppresses excessive braking force at the time of braking of the vehicle. An operating state detecting means that detects each operating state of the automatic braking device and the ABS, and a pressure increasing rate changing means that receives a signal from the detecting means are provided. The changing means changes the pressure increasing rate of the brake pressure to be lower than usual when the ABS is operated during the operation of the automatic braking device, and thereafter, the operation of the ABS is ended. Furthermore, the degree of decreasing the pressure increasing rate is changed according to the difference between the actual deceleration of the vehicle during the operation of the ABS and the target deceleration of the automatic braking device at the end of the operation of the ABS."

When the anti-skid control is started during the execution of the automatic braking control, interference between the two controls may occur in addition to the above-described problem of overshoot. For example, when the coefficient of friction of the traveling road surface is low, the brake fluid pressure may be increased by the automatic braking control, and the anti-skid control may be executed by the increase in the brake fluid pressure. Automatic braking control attempts to increase the brake fluid pressure to achieve the target deceleration, but anti-skid control attempts to decrease the brake fluid pressure to reduce wheel slip. A braking control device that can suppress such control interference is desired.

CITATIONS LIST

Patent Literature

Patent Literature 1: Japanese Unexamined Patent Application Publication No. 5-319233

SUMMARY OF INVENTION

Technical Problems

An object of the present invention is to provide a vehicle braking control device in which automatic braking control and anti-skid control are executed, in which interference between two controls can be suitably suppressed.

Solutions to Problems

A vehicle braking control device according to the present invention applies a braking torque (Tq) to wheels (WH) of the vehicle, the braking control device including a controller (ECU) that executes an automatic braking control for adjusting the braking torque (Tq) based on a target deceleration value (Gt) of the vehicle corresponding to a distance (Ob) between an object in front of the vehicle and the vehicle, and an anti-skid control for adjusting the braking torque (Tq) based on a speed (Vw) of the wheels (WH) to suppress excessive slip (Sw) of the wheels (WH).

In the vehicle braking control device according to the present invention, the controller (ECU) is configured to calculate an actual deceleration value (Ge) corresponding to the target deceleration value (Gt), execute a feedback control (PH, IG) based on the target deceleration value (Gt) and the actual deceleration value (Ge) to bring the actual deceleration value (Ge) closer to the target deceleration value (Gt), and reduce a control gain (Kc) of the feedback control (PH, IG) when the anti-skid control is executed (Fa=1). Furthermore, the controller (ECU) may be configured to prohibit (Kc=0) the execution of the feedback control (PH, IG) when the anti-skid control is executed (Fa=1).

According to the above configuration, during the execution of the anti-skid control, the effect of the deceleration feedback control of the automatic braking control is weakened (or the deceleration feedback control is stopped and the open loop control is performed). The mutual interference between the two controls thus can be suppressed.

DESCRIPTION OF EMBODIMENT

<Symbols of Configuring Members, Etc., Subscripts at the End of the Symbols, and Motion/Moving Direction>

In the following description, configuring members, calculation processes, signals, characteristics, and values having the same symbol such as "ECU" have the same functions. Subscripts "i" to "l" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders is described as wheel cylinder CWi of the right front wheel, wheel cylinder CWj of the left front wheel, wheel cylinder CWk of the right rear wheel, and wheel cylinder CWl of the left rear wheel. Furthermore, the subscripts "i" to "l" at the end of the symbols can be omitted. When the subscripts "i" to "l" are omitted, each symbol represents a generic name of each of the four wheels.

For example, "WH" represents each wheel, and "CW" represents each wheel cylinder.

The subscripts "1" and "2" added to the end of various symbols are comprehensive symbols indicating which of the two braking systems they relate to. Specifically, "1" indicates the first system and "2" indicates the second system. For example, in the two master cylinder fluid passages, they are expressed as a first master cylinder fluid passage HM1 and a second master cylinder fluid passage HM2. Furthermore, the subscripts "1" and "2" at the end of the symbol can be omitted. When the subscripts "1" and "2" are omitted, each symbol represents a generic name of each of the two braking systems. For example, "HM" represents the master cylinder fluid passage of each braking system.

<First Embodiment of Vehicle Braking Control Device According to the Present Invention>

Figure 1:
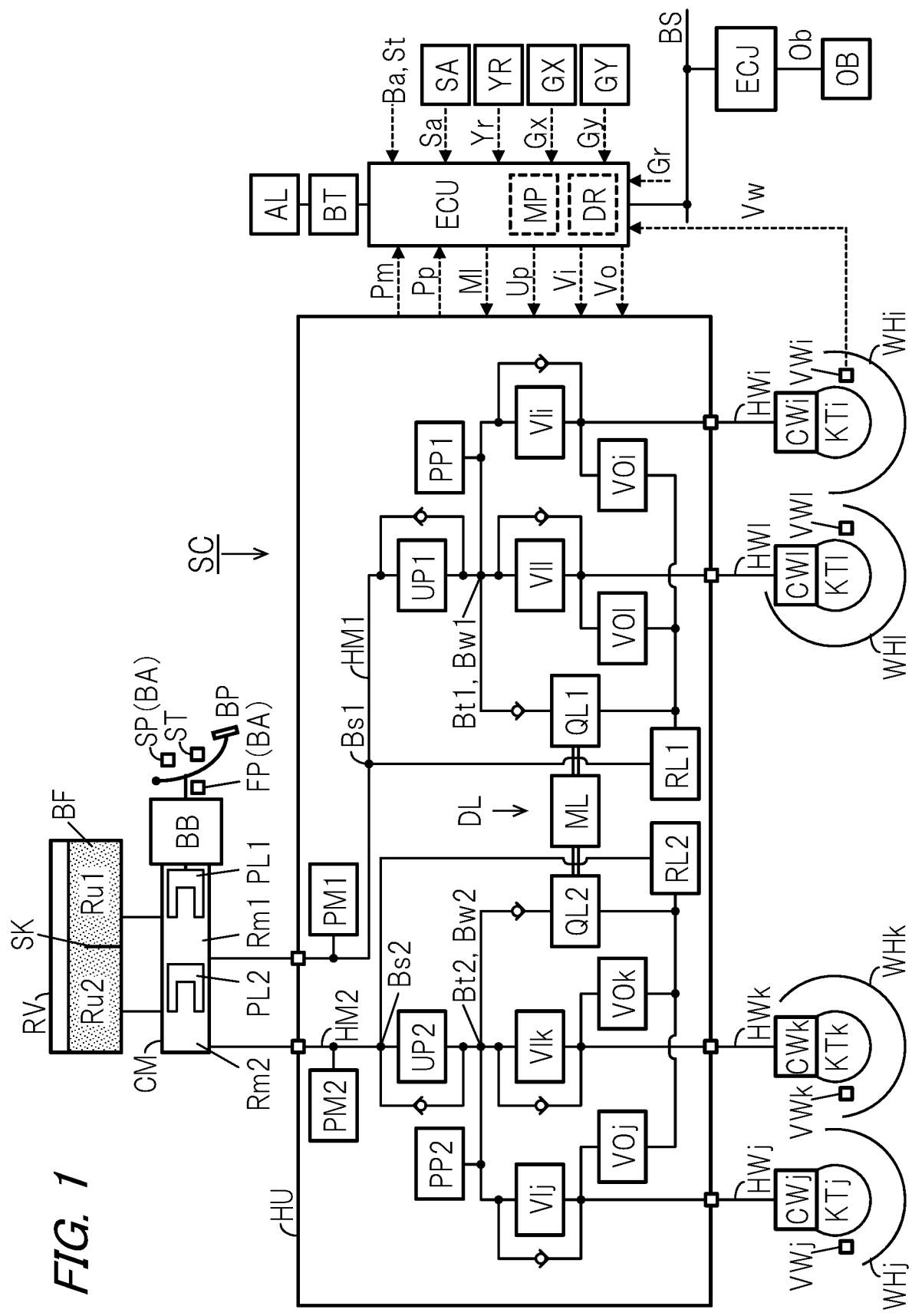
FIG. 1 is an overall configuration view for describing a first embodiment of a vehicle braking control device SC according to the present invention.

A first embodiment of a braking control device SC according to the present invention will be described with reference to an overall configuration view of FIG. 1. A master cylinder CM is connected to a wheel cylinder CW by way of a master cylinder fluid passage HM and a wheel cylinder fluid passage HW. The fluid passage is a passage for moving the brake fluid BF which is the working fluid of the braking control device SC, and corresponds to a brake piping, a fluid path of a fluid unit, a hose, and the like. The inside of each fluid passage is filled with the brake fluid BF. In the fluid passage, the side closer to the reservoir RV (the side farther from the wheel cylinder CW) is referred to as the "upstream side" or "upper part", and the side closer to the wheel cylinder CW (the side farther from the reservoir RV) is referred to as the "downstream side" or "lower part".

In a general vehicle, two systems are adopted as fluid passages to ensure redundancy. A first system (system related to the first master cylinder chamber Rm1) of the two systems of fluid passages is connected to the wheel cylinders CWi and CW1. A second system (system related to the second master cylinder chamber Rm2) of the two systems of fluid passages is connected to the wheel cylinders CWj and CWk. That is, in the first embodiment, a so-called diagonal type (also referred to as "X type") is adopted as the two-system fluid passage.

The vehicle equipped with the braking control device SC includes a brake operation member BP, a wheel cylinder CW, a reservoir RV, a master cylinder CM, and a brake booster BB.

The brake operation member (e.g., brake pedal) BP is a member operated by the driver to decelerate the vehicle. The braking torque Tq of the wheel WH is adjusted, and the braking force is generated at the wheel WH by operating the brake operation member BP.

A rotating member (e.g., brake disc) KT is fixed to each wheel WH of the vehicle. A brake caliper is arranged so as to sandwich the rotating member KT. The brake caliper is provided with the wheel cylinder CW. As the pressure (brake fluid pressure) Pw of the brake fluid BF in the wheel cylinder CW is increased, the friction member (e.g., brake pad) is pressed against the rotating member KT. Since the rotating member KT and the wheel WH are fixed to rotate integrally, a braking torque Tq is generated at the wheel WH by the frictional force generated at this time. The braking torque Tq causes a deceleration slip on the wheel WH, and as a result, a braking force is generated.

The reservoir (atmospheric pressure reservoir) RV is a tank for the working fluid, and the brake fluid BF is stored therein. The inside of the atmospheric pressure reservoir RV is divided into two parts by a partition plate SK. The first master reservoir chamber Ru1 is connected to the first master cylinder chamber Rm1, and the second master reservoir chamber Ru2 is connected to the second master cylinder chamber Rm2.

The master cylinder CM is mechanically connected to the brake operation member BP through a brake rod, a clevis (U-shaped link) and the like. The master cylinder CM is a tandem type, and its interior is divided into first and second master cylinder chambers Rm1 and Rm2 by first and second master pistons PL1 and PL2. When the brake operation member BP is not operated, the first and second master cylinder chambers Rm1 and Rm2 of the master cylinder CM are in communication with the reservoir RV (first and second master reservoir chambers Ru1 and Ru2). The master cylinder CM has output ports of two systems including a first port and a second port, and receives the supply of the brake fluid from the reservoir RV and outputs the first and second master cylinder fluid pressures Pm1 and Pm2 at the first and second ports. The first and second master cylinder fluid passages HM1 and HM2 are connected to the master cylinder CM (particularly, first and second ports).

When the brake operation member BP is operated, the first and second master pistons PL1, PL2 in the master cylinder CM are pushed, and the first and second master pistons PL1, PL2 move forward. Such forward movement causes the first and second master cylinder chambers Rm1 and Rm2 to be shut off from the reservoir RV (particularly, the first and second master reservoir chambers Ru1 and Ru2). When the operation of the brake operation member BP is increased, the volumes of the master cylinder chambers Rm1 and Rm2 decrease, and the brake fluid BF is pumped from the master cylinder CM toward the wheel cylinder CW.

The operation force Fp of the brake operation member BP by the driver is reduced by the brake booster (also simply referred to as "booster") BB. A negative pressure type booster BB is used. The negative pressure is generated by an engine or an electric negative pressure pump. A booster BB that employs an electric motor as a drive source may be adopted (e.g., an electric booster, an accumulator type hydraulic booster).

Furthermore, the vehicle includes a wheel speed sensor VW, a steering angle sensor SA, a yaw rate sensor YR, a longitudinal acceleration sensor GX, a lateral acceleration sensor GY, a braking operation amount sensor BA, an operation switch ST, and a distance sensor OB.

Each wheel WH of the vehicle includes a wheel speed sensor VW to detect the wheel speed Vw. The signal of the wheel speed Vw is used for independent control of each wheel such as anti-skid control for suppressing the lock tendency of the wheel WH (i.e., excessive deceleration slip).

A steering operation member (e.g., a steering wheel) includes a steering angle sensor SA so as to detect a steering angle Sa. The vehicle body of the vehicle includes a yaw rate sensor YR to detect a yaw rate (yaw angular velocity) Yr. Furthermore, the longitudinal acceleration sensor GX and the lateral acceleration sensor GY are provided to detect the acceleration (longitudinal acceleration) Gx in the longitudinal direction (advancing direction) of the vehicle and the acceleration (lateral acceleration) Gy in the lateral direction (direction perpendicular to the advancing direction). These signals are used for vehicle motion control such as vehicle stabilization control (so-called ESC) for suppressing excessive oversteer behavior and understeer behavior.

A braking operation amount sensor BA is provided so as to detect an operation amount Ba of the brake operation member BP (brake pedal) by the driver. As the braking operation amount sensor BA, at least one of a master cylinder fluid pressure sensor PM that detects the fluid pressure of the master cylinder CM (master cylinder fluid pressure) Pm, an operation displacement sensor SP that detects the operation displacement Sp of the brake operation member BP, and an operation force sensor FP that detects the operation force Fp of the brake operation member BP is adopted. That is, the operation amount sensor BA detects at least one of the master cylinder fluid pressure Pm, the operation displacement Sp, and the operation force Fp as the braking operation amount Ba.

An operation switch ST is provided on the brake operation member BP. The operation switch ST detects whether the driver has operated the brake operation member BP. When the brake operation member BP is not operated (that is, at the time of non-braking), an OFF signal is output as the operation signal St by the braking operation switch ST. On the other hand, when the brake operation member BP is operated (that is, at the time of braking), an ON signal is output as the operation signal St. The wheel speed Vw, the steering angle Sa, the yaw rate Yr, the longitudinal acceleration Gx, the lateral acceleration Gy, the braking operation amount Ba, and the braking operation signal St detected by each sensor (VW etc.) are input to the controller ECU. The controller ECU calculates the vehicle body speed Vx based on the wheel speed Vw.

The vehicle is provided with a distance sensor OB so as to detect a distance (relative distance) Ob between an object existing in front of the own vehicle (another vehicle, fixed object, person, bicycle, etc.) and the own vehicle. For example, a camera, a radar, or the like is employed as the distance sensor OB. The distance Ob is input to the controller ECJ. The controller ECJ calculates the required deceleration Gr based on the relative distance Ob.

<<Electronic Control Unit ECU>>

The braking control device SC includes a controller ECU and a fluid unit HU. An electronic control unit (also referred to as "controller") ECU is configured by an electric circuit substrate on which a microprocessor MP or the like is mounted and a control algorithm programmed in the microprocessor MP. The controller ECU is network-connected to another controller through an in-vehicle communication bus BS so as to share signals (detected values, calculated values, etc.). For example, the braking controller ECU is connected to the driving support controller ECJ through the communication bus BS. The vehicle body speed Vx is transmitted from the braking controller ECU to the driving support controller ECJ. On the other hand, a required deceleration Gr (target value) for executing the automatic braking control is transmitted from the driving support controller ECJ to the braking controller ECU to avoid collision with an obstacle (or to reduce damage at the time of collision).

The controller ECU (electronic control unit) controls the electric motor ML of the fluid unit HU and three different types of electromagnetic valves UP, VI, and VO. Specifically, drive signals Up, Vi, and Vo for controlling the various solenoid valves UP, VI, and VO are calculated based on a control algorithm in the microprocessor MP. Similarly, a drive signal Ml for controlling the electric motor ML is calculated.

The controller ECU is provided with a drive circuit DR for driving the electromagnetic valves UP, VI, VO, and the electric motor ML. In the drive circuit DR, a bridge circuit is formed by switching elements (power semiconductor devices such as MOS-FET and IGBT) to drive the electric motor ML. The energization state of each switching element is controlled based on the motor drive signal Ml, and the output of the electric motor ML is controlled. Furthermore, in the drive circuit DR, the energization state (i.e., the excited state) of the electromagnetic valves UP, VI, and VO is controlled by the switching element based on the drive signals Up, Vi, and Vo so as to drive the electromagnetic valves. The drive circuit DR includes an energization amount sensor that detects the actual energization amount of the electric motor ML and the electromagnetic valves UP, VI, and VO. For example, a current sensor is provided as an energization amount sensor, and a supply current to the electric motor ML and the electromagnetic valves UP, VI, and VO is detected.

A braking operation amount Ba (Pm, Sp, Fp), a braking operation signal St, a downstream fluid pressure Pp, a wheel speed Vw, a yaw rate Yr, a steering angle Sa, a longitudinal acceleration Gx, a lateral acceleration Gy, and the like are input to the braking controller ECU. Furthermore, the required deceleration Gr is input from the driving support controller ECJ through the communication bus BS.

For example, in the braking controller ECU, anti-skid control is executed based on the wheel speed Vw so as to suppress excessive deceleration slip of the wheel WH (e.g., wheel lock). In the controller ECU, vehicle stabilization control (so-called ESC) for suppressing unstable behavior (excessive oversteer behavior, understeer behavior) of the vehicle is executed based on the actual yaw rate Yr or the like. Furthermore, in the controller ECU, automatic braking control is executed based on the required deceleration Gr so as to avoid collision with an obstacle (or to reduce damage at the time of collision).

<<Fluid Unit HU>>

The fluid unit HU is connected to the first and second master cylinder fluid passages HM1 and HM2. At parts Bw1 and Bw2 in the fluid unit HU, the master cylinder fluid passages HM1 and HM2 are branched into wheel cylinder fluid passages HWi to HW1 and connected to the wheel cylinders CWi to CW1. Specifically, the first master cylinder fluid passage HM1 is branched into wheel cylinder fluid passages HWi and HW1 at the first branch part Bw1. The wheel cylinders CWi and CW1 are connected to the wheel cylinder fluid passages HWi and HW1. Similarly, the second master cylinder fluid passage HM2 is branched into wheel cylinder fluid passages HWj and HWk at the second branch part Bw2. The wheel cylinders CWj, CWk are connected to the wheel cylinder fluid passages HWj, HWk.

The fluid unit HU is configured by an electric pump DL, a low-pressure reservoir RL, a pressure adjusting valve UP, a master cylinder fluid pressure sensor PM, a downstream fluid pressure sensor PP, an inlet valve VI, and an outlet valve VO.

The electric pump DL includes one electric motor ML and two fluid pumps QL1 and QL2. The electric motor (reflux motor) ML is controlled by the controller ECU based on the drive signal Ml. The first and second fluid pumps QL1 and QL2 are integrally rotated and driven by the electric motor ML. The brake fluid BF is pumped up by the first and second fluid pumps QL1 and QL2 from the first and second suction parts Bs1 and Bs2 located upstream of the first and second pressure adjusting valves UP1 and UP2. The pumped brake fluid BF is discharged to first and second discharge parts Bt1 and Bt2 located downstream of the first and second pressure adjusting valves UP1 and UP2. Here, the electric pump DL is rotated only in one direction. The first and second low-pressure reservoirs RL1, RL2 are provided on the suction sides of the first and second fluid pumps QL1, QL2.

The first and second pressure adjusting valves UP1 and UP2 are provided in the first and second master cylinder fluid passages HM1 and HM2. As the pressure adjusting valve UP (generic name of the first and second pressure adjusting valves UP1 and UP2), a linear type electromagnetic valve (also referred to as "proportional valve" or "differential pressure valve") in which a valve open amount (lift amount) is continuously controlled based on the energization state (e.g., supply current) is adopted. The pressure adjusting valve UP is controlled by the controller ECU based on a drive signal Up (generic name of the first and second drive signals Up1 and Up2). Here, normally-open type electromagnetic valves are adopted as the first and second pressure adjusting valves UP1 and UP2.

The controller ECU determines the target energization amount of the pressure adjusting valve UP based on the calculation results of the vehicle stabilization control, the automatic braking control, and the like (e.g., the target fluid pressure of the wheel cylinder CW). The drive signal Up is determined based on the target energization amount. Then, in accordance with the drive signal Up, the energization amount (current) to the pressure adjusting valve UP is adjusted, and the valve open amount of the pressure adjusting valve UP is adjusted.

When the fluid pump QL is driven, a reflux (flow of the circulating brake fluid BF) of "Bs→RL→QL→Bt→UP→Bs" is formed. When energization to the pressure adjusting valve UP is not performed and the normally-open type pressure adjusting valve UP is in the fully open state, the fluid pressure upstream of the pressure adjusting valve UP (i.e., the master cylinder fluid pressure Pm) and the fluid pressure Pp downstream of the pressure adjusting valve UP (i.e., the brake fluid pressure Pw when the electromagnetic valves VI and VO are not driven) substantially match.

The energization amount to the normally-open type pressure adjusting valve UP is increased, and the valve open amount of the pressure adjusting valve UP is reduced. The reflux of the brake fluid BF is reduced by the pressure adjusting valve UP, and the downstream fluid pressure Pp (=Pw) is increased from the upstream fluid pressure Pm by the orifice effect. That is, the differential pressure (Pp>Pm) between the upstream fluid pressure Pm and the downstream fluid pressure Pp is adjusted by the electric pump DL and the pressure adjusting valve UP. The downstream fluid pressure Pp (i.e., the brake fluid pressure Pw) is increased from the master cylinder fluid pressure Pm corresponding to the operation of the brake operation member BP by controlling the electric pump DL and the pressure adjusting valve UP. For example, when the brake operation member BP is not operated, "Pm=0", but the brake fluid pressure Pw is increased to a value larger than "0".

The first and second master cylinder fluid pressure sensors PM1, PM2 are provided upstream of the pressure adjusting valve UP so as to detect the first and second master cylinder pressures Pm1, Pm2. Furthermore, the first and second downstream fluid pressure sensors PP1 and PP2 are provided downstream of the pressure adjusting valve UP so as to detect the first and second downstream fluid pressures Pp1 and Pp2. Note that at least one of the four fluid pressure sensors PM1, PM2, PP1, and PP2 can be omitted.

The master cylinder fluid passage HM is branched (divided) into the wheel cylinder fluid passage HW of each front wheel at a part (branch part) Bw downstream of the pressure adjusting valve UP. An inlet valve VI and an outlet valve VO are provided in the wheel cylinder fluid passage HW. A normally-open type on/off electromagnetic valve is adopted as the inlet valve VI. In addition, a normally-closed type on/off electromagnetic valve is adopted as the outlet valve VO. Here, the on/off electromagnetic valve is a two-port two-position switching type electromagnetic valve having two positions, an open position and a closed position. The electromagnetic valves VI and VO are controlled by the controller ECU based on the drive signals Vi and Vo. The brake fluid pressure Pw of each wheel can be independently controlled by the inlet valve VI and the outlet valve VO.

In the inlet valve VI and the outlet valve VO, the configuration related to each wheel WH is the same. A normally-open type inlet valve VI is provided in the wheel cylinder fluid passage HW (fluid passage connecting the part Bw and the wheel cylinder CW). The wheel cylinder fluid passage HW is connected to the low-pressure reservoir RL through a normally-closed type outlet valve VO at a downstream of the inlet valve VI. For example, in the independent control of each wheel (anti-skid control, vehicle stabilization control, etc.), the inlet valve VI is set to the closed position and the outlet valve VO is set to the open position to reduce the fluid pressure Pw in the wheel cylinder CW. The inflow of the brake fluid BF from the inlet valve VI is prevented, the brake fluid BF in the wheel cylinder CW flows out to the low-pressure reservoir RL, and the brake fluid pressure Pw is reduced. Furthermore, in order to increase the brake fluid pressure Pw, the inlet valve VI is set to the open position and the outlet valve VO is set to the closed position. The outflow of the brake fluid BF to the low-pressure reservoir RL is inhibited, the downstream fluid pressure Pp adjusted by the pressure adjusting valve UP is introduced into the wheel cylinder CW, and the brake fluid pressure Pw is increased.

The braking torque Tq of the wheel WH is increased or decreased (adjusted) by increasing or decreasing the brake fluid pressure Pw. When the brake fluid pressure Pw increases, the force with which the friction material is pressed against the rotating member KT increases, and the braking torque Tq increases. As a result, the braking force of the wheel WH is increased. On the other hand, when the brake fluid pressure Pw decreases, the pressing force of the friction material on the rotating member KT decreases, and the braking torque Tq decreases. As a result, the braking force of the wheel WH is reduced.

<Calculation Process in the Driving Support Controller ECJ and the Braking Controller ECU>

Figure 2:
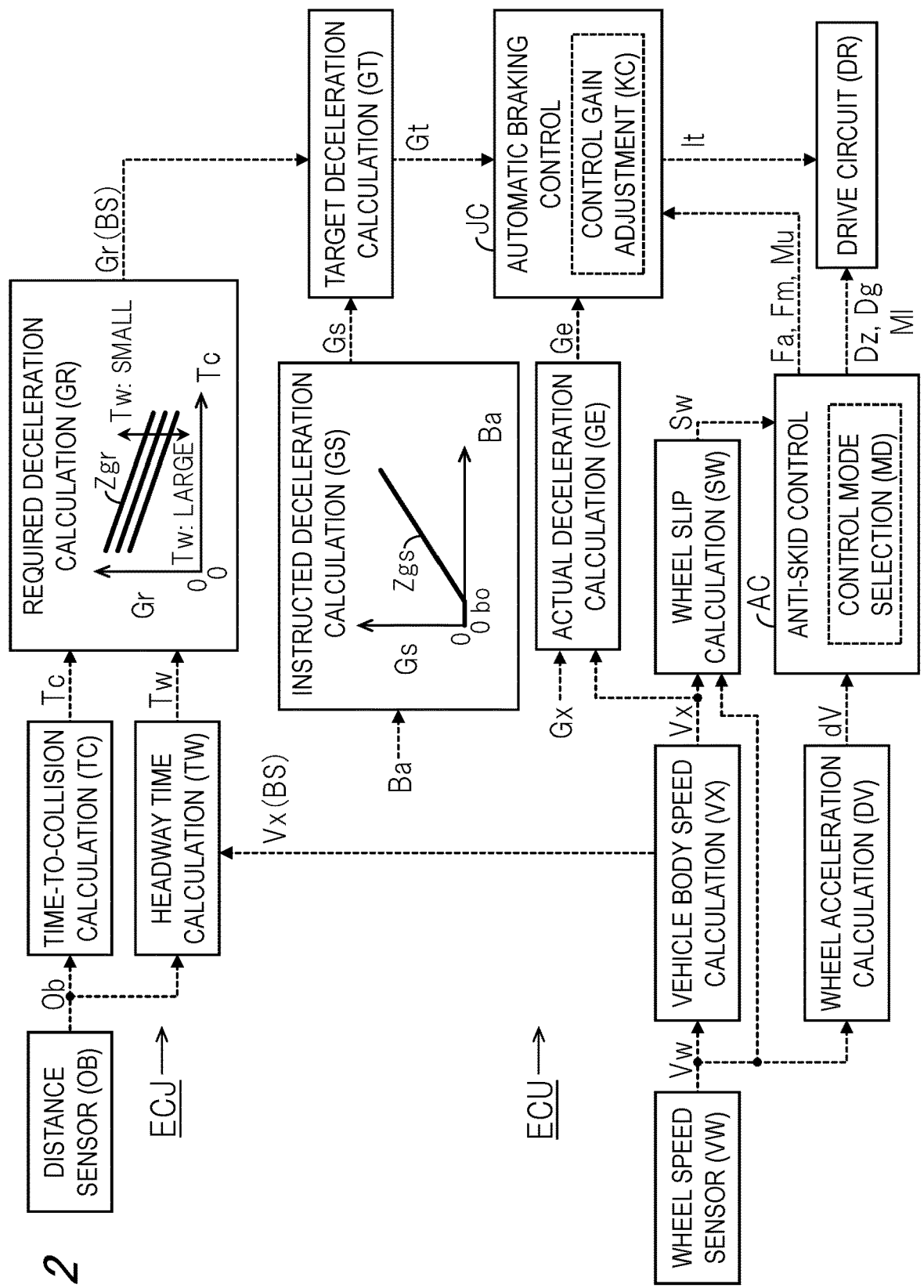
FIG. 2 is a functional block diagram for explaining a calculation process in a driving support controller ECJ and a braking controller ECU.

The calculation process in the driving support controller ECJ and the braking controller ECU will be described with reference to the functional block diagram of FIG. 2. The required deceleration Gr is calculated in the automatic braking control by the driving support controller ECJ. The required deceleration Gr is transmitted to the braking controller ECU through the communication bus BS. The fluid unit HU (ML, UP, etc.) is controlled by the braking controller ECU to adjust the braking torque Tq of the wheel WH based on the required deceleration Gr. Furthermore, in the controller ECU, anti-skid control is executed so as to suppress excessive deceleration slip of the wheel WH.

A distance sensor OB is provided in the vehicle to detect the distance (relative distance) Ob between an object (another vehicle, a fixed object, a bicycle, a person, an animal, etc.) existing in front of which the own vehicle is traveling and the own vehicle. For example, a camera, a radar, or the like is used as the distance sensor OB. When a fixed object is stored in the map information, a navigation system can be used as the distance sensor OB. The detected relative distance Ob is input to the driving support controller ECJ.

The driving support controller ECJ includes a time-to-collision calculation block TC, a headway time calculation block TW, and a required deceleration calculation block GR.

In the time-to-collision calculation block TC, the time-to-collision Tc is calculated based on the relative distance Ob between the object in front of the vehicle and the own vehicle. The time-to-collision Tc is a time required until the vehicle and the object collide. Specifically, the time-to-collision Tc is determined by dividing the relative distance Ob between the object in front of the vehicle and the own vehicle by the speed difference (i.e., the relative speed) between the obstacle and the own vehicle. Here, the relative speed is calculated by time differentiating the relative distance Ob.

In the headway time calculation block TW, a headway time Tw is calculated based on the relative distance Ob and the vehicle body speed Vx. The headway time Tw is a time required for the own vehicle to reach the current position of the object in front. Specifically, the headway time Tw is calculated by dividing the relative distance Ob by the vehicle body speed Vx. When the object in front of the own vehicle is stationary, the time-to-collision Tc and the headway time Tw match. The vehicle body speed Vx is obtained from a vehicle body speed calculation block VX of the controller ECU through the communication bus BS.

In the required deceleration calculation block GR, the required deceleration Gr is calculated based on the time-to-collision Tc and the headway time Tw. The required deceleration Gr is a target value of the deceleration of the own vehicle to avoid a collision between the own vehicle and an object in front. The required deceleration Gr is calculated in accordance with the calculation map Zgr so as to be smaller as the time-to-collision Tc becomes larger (or larger as the time-to-collision Tc becomes smaller). Furthermore, the required deceleration Gr can be adjusted based on the headway time Tw. The required deceleration Gr is adjusted based on the headway time Tw such that the required deceleration Gr becomes smaller as the headway time Tw becomes larger (or the required deceleration Gr becomes larger as the headway time Tw becomes smaller). The required deceleration Gr is input to a target deceleration calculation block GT in the braking controller ECU through the communication bus B S.

Each wheel WH of the vehicle is provided with a wheel speed sensor VW to detect a rotation speed (wheel speed) Vw of the wheel WH. The detected wheel speed Vw is input to the controller ECU. The braking controller ECU includes a vehicle body speed calculation block VX, a wheel acceleration calculation block DV, a wheel slip calculation block SW, an anti-skid control block AC, an instructed deceleration calculation block GS, a target deceleration calculation block GT, an actual deceleration calculation block GE, an automatic braking control block JC, and a drive circuit DR.

In the vehicle body speed calculation block VX, the vehicle body speed Vx is calculated based on the wheel speed Vw. For example, at the time of non-braking including acceleration of the vehicle, the vehicle body speed Vx is calculated based on the slowest (slowest wheel speed) of the four wheel speeds Vw. At the time of braking, the vehicle body speed Vx is calculated based on the fastest (fastest wheel speed) of the four wheel speeds Vw. Furthermore, in the calculation of the vehicle body speed Vx, a limit may be imposed on the time change amount. That is, an upper limit value aup of the increasing gradient and a lower limit value adn of the decreasing gradient of the vehicle body speed Vx are set, and the change in the vehicle body speed Vx is restricted by the upper and lower limit values aup, adn. The calculated Vx is transmitted to the headway time Tw of the controller ECJ.

In the wheel acceleration calculation block DV, a wheel acceleration dV (time change amount of the wheel speed Vw) is calculated based on the wheel speed Vw. Specifically, the wheel speed Vw is time differentiated to calculate the wheel acceleration dV.

In the wheel slip calculation block SW, a deceleration slip (also referred to as "wheel slip") Sw of the wheel WH is calculated based on the vehicle body speed Vx and the wheel speed Vw. The wheel slip Sw is a state quantity indicating the degree of grip of the wheel WH with respect to the traveling road surface. For example, a deceleration slip speed (deviation between the vehicle body speed Vx and the wheel speed Vw) hV of the wheel WH is calculated as the wheel slip Sw (hV=Vx−Vw). Furthermore, as the wheel slip Sw, a wheel slip ratio (=hV/Vx) in which the slip speed (speed deviation) hV is made dimensionless with the vehicle body speed Vx may be adopted.

In the anti-skid control block AC, anti-skid control is executed based on the wheel acceleration dV and the wheel slip Sw. The adjustment of the brake fluid pressure Pw in the anti-skid control is achieved by selecting either one of the modes, the "decrease mode (pressure decreasing mode) Mg for decreasing the braking torque Tq (i.e., brake fluid pressure Pw)" and the "increase mode (pressure increasing mode) Mz for increasing the braking torque Tq (i.e., brake fluid pressure Pw). Here, the decrease mode Mg and the increasing mode Mz are generically called "control modes" and are determined by a control mode selection block MD included in the anti-skid control block AC.

A plurality of thresholds values is set in advance in the control mode selection block MD to determine each control mode. Either one of the control modes, the decrease mode Mg or the increasing mode Mz, is selected based on the correlation between these threshold values and "the wheel acceleration dV and the wheel slip Sw". In addition, in the control mode selection block MD, the duty ratio Dg of the outlet valve VO and the duty ratio Dz of the inlet valve VI are determined. Here, the "duty ratio" is a ratio of the energization time (ON time) per unit time. Then, the electromagnetic valves VI, VO are driven and the brake fluid pressure Pw of the wheel cylinder CW is adjusted on the basis of the selected control mode and the determined duty ratio. In addition, the drive signal M1 of the electric motor ML is calculated to return the brake fluid BF from the low-pressure reservoir RL to the upstream part Bt of the inlet valve VI.

When the decrease mode Mg is selected by the anti-skid control and the brake fluid pressure Pw is decreased, the inlet valve VI is closed and the outlet valve VO is opened. That is, the pressure increasing duty ratio Dz is determined to be "100% (always energized)", and the outlet valve VO is driven based on the pressure decreasing duty ratio Dg. The brake fluid BF in the wheel cylinder CW is moved to the low-pressure reservoir RL, and the brake fluid pressure Pw is reduced. Here, the pressure decreasing speed (time gradient in decreasing the brake fluid pressure Pw) is determined by the duty ratio Dg of the outlet valve VO. "100%" of the pressure decreasing duty ratio Dg corresponds to the normally-open state of the outlet valve VO, and the brake fluid pressure Pw is rapidly reduced. The closed position of the outlet valve VO is achieved by "Dg=0% (non-energization)".

When the increasing mode Mz is selected by the anti-skid control and the brake fluid pressure Pw is increased, the inlet valve VI is opened and the outlet valve VO is closed. That is, the pressure decreasing duty ratio Dg is determined to be "0%", and the inlet valve VI is driven based on the pressure increasing duty ratio Dz. The brake fluid BF is moved to the wheel cylinder CW, and the brake fluid pressure Pw is increased. The pressure increasing speed (time gradient in increasing the brake fluid pressure) is adjusted by the duty ratio Dz of the inlet valve VI. "0%" of the pressure increasing duty ratio Dz corresponds to the normally-open state of the inlet valve VI, and the brake fluid pressure Pw is rapidly increased. The closed position of the inlet valve VI is achieved by "Dz=100% (always energized)".

When the brake fluid pressure Pw needs to be maintained by the anti-skid control, the outlet valve VO or the inlet valve VI is always closed in the decrease mode Mg or the increasing mode Mz. Specifically, in the decrease mode Mg, when it is necessary to maintain the brake fluid pressure Pw, the duty ratio Dg of the outlet valve VO is determined to be "0% (normally-closed state)". Furthermore, in the increasing mode Mz, when it is necessary to maintain the brake fluid pressure Pw, the duty ratio Dz of the inlet valve VI is determined to be "100% (normally-closed state)".

In the anti-skid control block AC, the friction coefficient Mu of the traveling road surface is estimated and calculated based on the deceleration Ge of the vehicle body at the time point when the anti-skid control is started (i.e., time point when the decrease mode Mg is selected for the first time). Specifically, the friction coefficient Mu is estimated to be larger as the actual deceleration Ge at that time point is larger, and the friction coefficient Mu is determined to be smaller as the actual deceleration Ge is smaller. The estimated friction coefficient Mu is input to the automatic braking control block JC.

In the anti-skid control block AC, various operation flags (signals) Fa, Fm indicating the execution status of the anti-skid control, the selected control mode, and the like are determined. For example, when the anti-skid control is not being executed, the operation flag Fa is set to "0". On the other hand, when the anti-skid control is executed, the operation flag Fa is set to "1". That is, the operation flag Fa is a signal indicating execution of the anti-skid control. Furthermore, in the anti-skid control block AC, when the increase mode Mz is selected for all the wheels WH (referred to as "four-wheel pressure increasing mode state"), the operation flag Fm is determined to be "1". On the other hand, when the decrease mode Mg is selected in at least one of the four wheels, the operation flag Fm is calculated to "0". That is, the operation flag Fm is a signal indicating the four-wheel pressure increasing mode state. The operation flags Fa and Fm are input to the automatic braking control block JC.

In the instructed deceleration calculation block GS, the instructed deceleration Gs is calculated based on the braking operation amount Ba. The instructed deceleration Gs is a target value of the vehicle deceleration generated by the operation of the brake operation member BP by the driver. The instructed deceleration Gs is calculated to be "0" according to the calculation map Zgs when the braking operation amount Ba is less than the predetermined value bo. When the braking operation amount Ba is greater than or equal to the predetermined value bo, the instructed deceleration Gs is calculated so as to monotonically increases from "0". Here, the predetermined value bo is a constant set in advance that corresponds to the play of the brake operation member BP.

In the target deceleration calculation block GT, the target deceleration Gt is calculated based on the required deceleration Gr and the instructed deceleration Gs. The target deceleration Gt is a final target value of the vehicle deceleration in the automatic braking control. In the target deceleration calculation block GT, the value of the required deceleration Gr and the instructed deceleration Gs having the larger absolute value is determined as the target deceleration Gt. Therefore, in the case of "|Gr|>|Gs|", automatic braking control is executed. However, in the case of "|Gr|<|Gs|", the automatic braking control is not executed because the driver has already decelerated the vehicle.

In the actual deceleration calculation block GE, an actual deceleration Ge is calculated based on the vehicle body speed Vx. The actual deceleration Ge is an actual value corresponding to the target deceleration Gt. Specifically, the actual deceleration Ge is calculated by time differentiating the vehicle body speed Vx. In addition, the longitudinal acceleration (longitudinal deceleration) Gx is used for calculating the actual deceleration Ge. In this case, the longitudinal acceleration Gx (detected value) is determined as it is as the actual deceleration Ge. The longitudinal acceleration Gx is detected by the longitudinal acceleration sensor GX, and the longitudinal acceleration Gx includes the gradient of the traveling road surface. Therefore, for calculating the actual deceleration Ge, the differential value of the vehicle body speed Vx is more preferable than the longitudinal acceleration Gx. Furthermore, the actual deceleration Ge may be calculated based on the differential value of the vehicle body speed Vx and the longitudinal acceleration Gx so as to improve the robustness.

In the automatic braking control block JC, automatic braking control is executed based on the target deceleration Gt and the actual deceleration Ge. In the automatic braking control block JC, feedback control based on the vehicle deceleration is executed so that the actual deceleration Ge matches the target deceleration Gt. In the automatic braking control block JC, the target energization amount It for calculating the drive signal Up of the pressure adjusting valve UP is determined.

The automatic braking control block JC includes a control gain adjustment block KC. In the control gain adjustment block KC, the control gain Kc of the feedback control is adjusted based on the operation flags Fa and Fm and the road surface friction coefficient Mu. Thus, mutual interference between the automatic braking control and the anti-skid control is suppressed, and the automatic braking control can be efficiently executed. Details of the automatic braking control block JC will be described later.

In the drive circuit DR, the electromagnetic valves VI, VO, UP, and the reflux motor ML are driven based on the pressure increasing/decreasing duty ratios Dz, Dg, the target energization amount It, and the drive signal Ml. In the drive circuit DR, a drive signal Vi for the inlet valve VI is calculated based on the pressure increasing duty ratio Dz so as to execute the anti-skid control, and a drive signal Vo for the outlet valve VO is determined based on the pressure decreasing duty ratio Dg. Furthermore, a drive signal M1 is calculated so as to drive the electric motor ML at a predetermined rotation number set in advance.

In the drive circuit DR, the drive signal Up for the pressure adjusting valve UP is determined based on the target energization amount It so as to execute the automatic braking control. Furthermore, the target rotation number of the electric motor ML is determined based on the target deceleration Gt, and the drive signal M1 is calculated based thereon. The target rotation number of the electric motor ML is calculated to be larger as the target deceleration Gt increases, and to be smaller as the target deceleration Gt decreases. When the automatic braking control and the anti-skid control are executed simultaneously, the electric motor ML is driven based on a larger value of the predetermined rotation number for the anti-skid control and the target rotation number for the automatic braking control.

Furthermore, in the automatic braking control as well, the electric motor ML may be driven at a predetermined rotation number set in advance.

In the drive circuit DR, the energization state of the electromagnetic valves VI, VO, UP, and the electric motor ML is controlled by a switching element (power semiconductor device) based on the drive signals Vi, Vo, Up, and Ml. The electromagnetic valves VI, VO, UP, and the electric motor ML are thereby driven, and the automatic braking control, the anti-skid control, and the like are executed.

<First Calculation Processing Example of the Automatic Braking Control Block JC>

Figure 3:
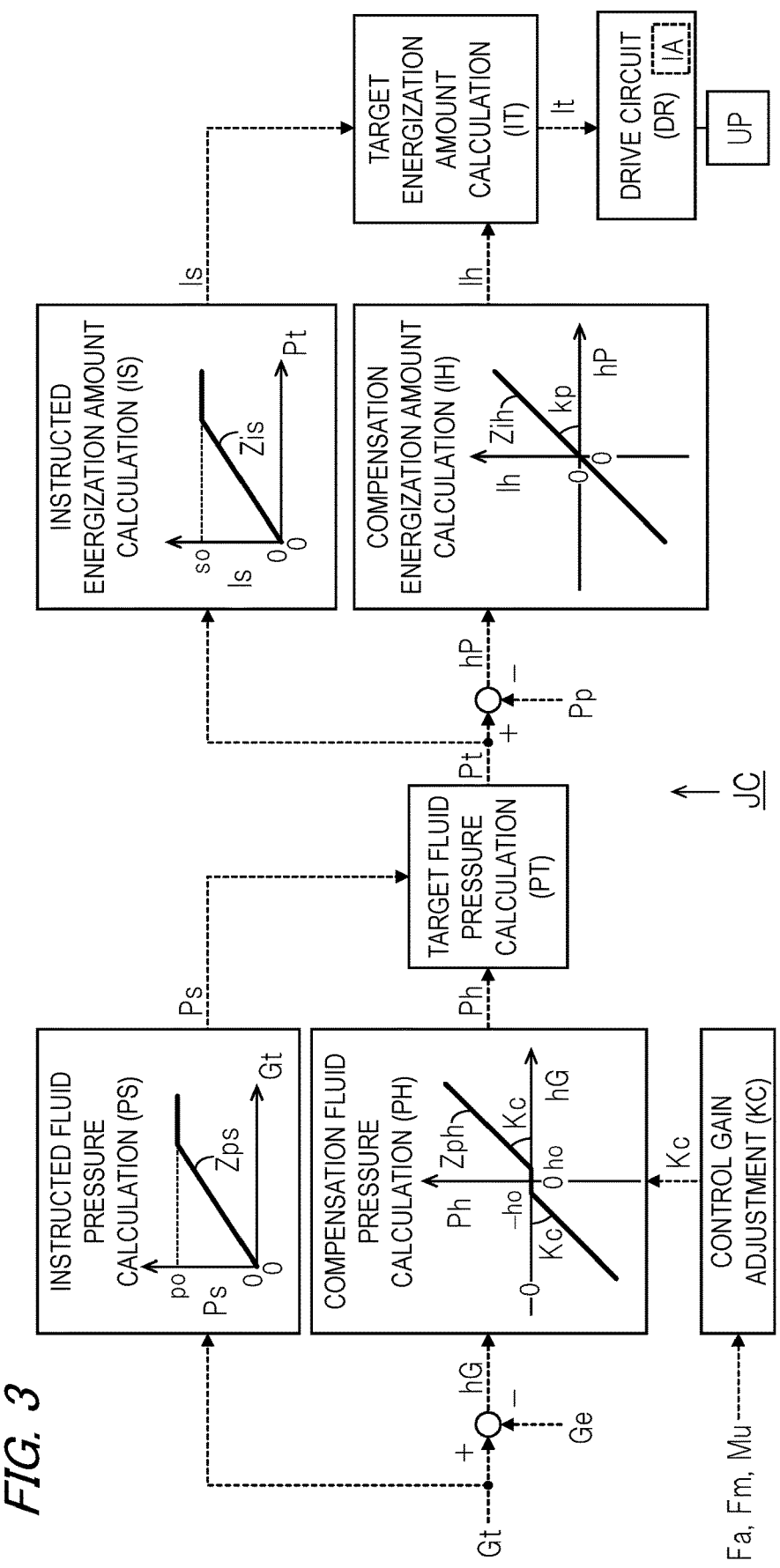
FIG. 3 is a functional block diagram for explaining a first calculation processing example of an automatic braking control block JC.

A first calculation processing example of the automatic braking control block JC will be described with reference to a functional block diagram of FIG. 3. In the deceleration feedback control of the automatic braking control block JC, the target energization amount It of the pressure adjusting valve UP is calculated based on the target deceleration Gt and the actual deceleration Ge so that the actual deceleration Ge matches the target deceleration Gt. The braking torque Tq is adjusted by the deceleration feedback control, and the target deceleration of the vehicle is ultimately achieved. The automatic braking control block JC adopts a cascade control configuration including a plurality of feedback control loops.

In the cascade control, the target value of the inner feedback control loop is determined by the output signal of the outer feedback control loop that measures the control target. In the inner feedback control loop, a control target having a smaller time delay than the outer one is controlled. Thereby, the responsiveness is improved and the entire feedback control is stabilized. In the first calculation processing example, the outermost control loop is based on the target value Gt and the actual value Ge related to the deceleration of the vehicle (referred to as "deceleration feedback control"). On the inside, a control loop (referred to as "fluid pressure feedback control") based on the target value Pt and the actual value Pp related to the brake fluid pressure is formed. On the innermost side, a control loop (referred to as "energization amount feedback control") based on the target value It and the actual value Ia related to the pressure adjusting valve UP is included.

The automatic braking control block JC is configured by an instructed fluid pressure calculation block PS, a compensation fluid pressure calculation block PH, a control gain adjustment block KC, a target fluid pressure calculation block PT, an instructed energization amount calculation block IS, a compensation energization amount calculation block IH, and a target energization amount calculation block IT.

In the instructed fluid pressure calculation block PS, the instructed fluid pressure Ps is calculated based on the target deceleration Gt. The instructed fluid pressure Ps is one of the target values of the fluid pressure. The instructed fluid pressure Ps is determined to increase with an increase in the target deceleration Gt according to the calculation map Zps. A predetermined upper limit value po (preset constant) is set for the instructed fluid pressure Ps. The instructed fluid pressure calculation block PS corresponds to deceleration feedforward control for improving the responsiveness of the deceleration feedback control.

The target deceleration Gt and the actual deceleration Ge are compared, and their deviation hG (=Gt−Ge) is calculated. The deceleration deviation hG is input to the compensation fluid pressure calculation block PH. In the compensation fluid pressure calculation block PH, the compensation fluid pressure Ph is calculated based on the deviation hG. In the control using only the instructed fluid pressure Ps, an error actually occurs between the actual deceleration Ge and the target deceleration Gt. The compensation fluid pressure Ph is calculated so as to reduce such an error. Similarly to the instructed fluid pressure Ps, the compensation fluid pressure Ph is also one of the target values of the fluid pressure. The compensation fluid pressure Ph is determined to be "0" according to the calculation map Zph, when the deviation hG is in a range from the value −ho to the value ho (i.e., when "−ho<hG<ho"). When the deviation hG is less than or equal to the predetermined value −ho, the compensation fluid pressure Ph is increased toward "0" with the increasing gradient Kc (variable value) as the deviation hG increases. When the deviation hG is greater than or equal to the predetermined value ho, the compensation fluid pressure Ph is increased from "0" with the increasing gradient Kc as the deviation hG increases. Here, the predetermined value ho is a constant set in advance, and forms a dead zone provided so that the feedback control does not become complicated.

The compensation fluid pressure calculation block PH corresponds to deceleration feedback control. The deceleration feedback control adjusts the braking torque Tq so as to ultimately achieve the target deceleration of the vehicle. The direct control target of the deceleration feedback control is the fluid pressure (downstream fluid pressure) Pp of the downstream part Bt of the pressure adjusting valve UP. Here, in the calculation map Zph for calculating the compensation fluid pressure Ph, the increasing gradient Kc is the control gain of the deceleration feedback control. The control gain Kc is for adjusting the effect of the feedback control. For example, when the control gain Kc is excessively large, the system is unstable, and overshoot is likely to occur. On the other hand, when the control gain Kc is excessively small, the sensitivity is low, and the target value becomes difficult to achieve. Therefore, the control gain Kc needs to be set to an appropriate value.

The feedback control is also called "PID control". The control gain Kc is a proportional gain (proportional term) in the feedback control. Therefore, the compensation fluid pressure Ph is determined based on the proportional element (=Kc×hG) of the deceleration deviation hG. Although not shown, the compensation fluid pressure Ph may be calculated in consideration of any one of the differential element of the deviation hG and the integral element of the deviation hG. In this case, the differential element is calculated by time differentiating the deviation hG and multiplying this by a differential gain (differential term). The integral element is determined by time integrating the deviation hG and multiplying this by an integral gain (integral term).

In the control gain adjustment block KC, the control gain Kc is determined based on the operation flags Fa and Fm of the anti-skid control and the friction coefficient Mu. When the anti-skid control is not executed, the control gain Kc is determined to be a predetermined value ko (nominal value) set in advance. When the anti-skid control is executed, the control gain Kc is adjusted so as to suppress control interference. Details of the method for determining the control gain Kc will be described later.

In the target fluid pressure calculation block PT, the target fluid pressure Pt is calculated based on the instructed fluid pressure Ps and the compensation fluid pressure Ph. The target fluid pressure Pt is a final target value of the fluid pressure. Specifically, the target fluid pressure Pt is determined by adding the compensation fluid pressure Ph to the instructed fluid pressure Ps.

In the instructed energization amount calculation block IS, the instructed energization amount Is is calculated based on the target fluid pressure Pt. The instructed energization amount Is is one of target values of the energization amount to the pressure adjusting valve UP. The instructed energization amount Is is determined to increase as the target fluid pressure Pt increases according to the calculation map Zis. A predetermined upper limit value so (a preset constant) is set for the instructed energization amount Is. The instructed energization amount calculation block IS corresponds to the fluid pressure feedforward control for improving the responsiveness of the fluid pressure feedback control.

The target fluid pressure Pt and the downstream fluid pressure Pp (detected value of the downstream fluid pressure sensor PP) are compared, and their deviation hP (=Pt−Pp) is calculated. The fluid pressure deviation hP is input to the compensation energization amount calculation block IH. In the compensation energization amount calculation block IH, the compensation energization amount Ih is calculated based on the fluid pressure deviation hP. In the control using only the instructed energization amount Is, an error between the downstream fluid pressure Pp and the target fluid pressure Pt actually occurs. The compensation energization amount Ih is calculated to reduce such an error. Similarly to the instructed energization amount Is, the compensation energization amount Ih is one of the target values of the fluid pressure. The compensation energization amount Ih is increased with an increasing gradient kp in accordance with the increase in the fluid pressure deviation hP according to the calculation map Zih. Here, the increasing gradient kp is a preset constant.

The compensation energization amount calculation block IH corresponds to fluid pressure feedback control. The increasing gradient kp of the compensation energization amount Ih is a control gain (proportional gain) in the fluid pressure feedback control. Therefore, the compensation energization amount Ih is determined based on the proportional element (=kp×hP) of the fluid pressure deviation hP. Similarly to the compensation fluid pressure calculation block PH, any one of the differential element and the integral element of the fluid pressure deviation hP can be considered in the calculation of the compensation energization amount Ih. Furthermore, a dead zone may be provided in the calculation of the compensation energization amount Ih.

In the target energization amount calculation block IT, the target energization amount It is calculated based on the instructed energization amount Is and the compensation energization amount Ih. The target energization amount It is a final target value of the energization amount. Specifically, the target energization amount It is determined by adding the compensation energization amount Ih to the instructed energization amount Is. The target energization amount It is input to the drive circuit DR.

In the drive circuit DR, the energization amount feedback control is executed on the pressure adjusting valve UP based on the target energization amount It. The drive circuit DR is provided with an energization amount sensor IA so as to detect an actual energization amount (e.g., current value) Ia to the pressure adjusting valve UP. Then, the energization amount feedback control is performed so that the actual energization amount Ia matches the target energization amount It. Specifically, similarly to other feedback controls, a deviation hI between the target energization amount It and the actual energization amount Ia is calculated, and energization amount to the pressure adjusting valve UP is adjusted so that the deviation hI approaches "0" based on the energization amount deviation hI.

<Second Calculation Processing Example of Automatic Braking Control Block JC>

Figure 4:
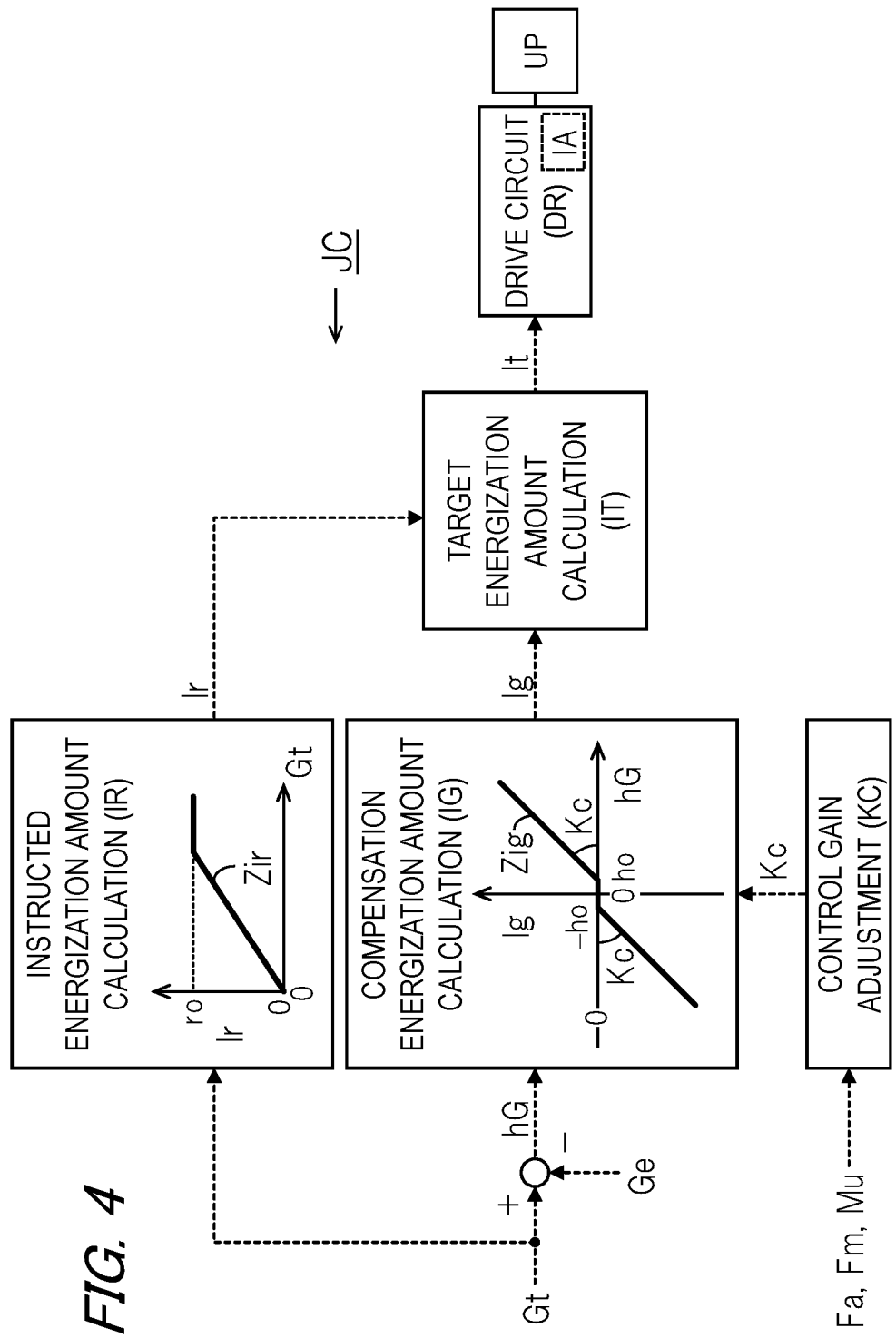
FIG. 4 is a functional block diagram for explaining a second calculation processing example of the automatic braking control block JC.

With reference to the functional block diagram of FIG. 4, a second calculation processing example of the automatic braking control block JC will be described. In the first calculation processing example, the "deceleration feedback control loop based on the target deceleration Gt and the actual deceleration Ge", and the "fluid pressure feedback control loop based on the target fluid pressure Pt and the actual fluid pressure Pp" were included. In the second calculation processing example, the fluid pressure feedback control loop is omitted. Accompanying therewith, in the fluid unit HU, the downstream fluid pressure sensor PP may be omitted. This is based on the fact that the pressure adjusting amount by the pressure adjusting valve UP changes proportionally according to the energization amount to the pressure adjusting valve UP (i.e., the supply current). In the second arithmetic processing example, in the deceleration feedback control based on the target deceleration Gt and the actual deceleration Ge, the energization amount of the pressure adjusting valve UP is the directly control target.

The automatic braking control block JC includes an instructed energization amount calculation block IR, a compensation energization amount calculation block IG, a control gain adjustment block KC, and a target energization amount calculation block IT.

In the instructed energization amount calculation block IR, the instructed energization amount Ir (one of the target values of the energization amount) is calculated based on the target deceleration Gt. The instructed energization amount calculation block IR corresponds to the deceleration feedforward control for improving the responsiveness of the deceleration feedback control. The instructed energization amount Ir is determined to increase as the target deceleration Gt increases according to the calculation map Zir. A predetermined upper limit value ro (a preset constant) is set for the instructed energization amount Ir.

Similarly to the first processing example, a deviation hG (=Gt−Ge) between the target deceleration Gt and the actual deceleration Ge is calculated. In the compensation energization amount calculation block IG, the compensation energization amount Ig (one of the target values of the energization amount) is calculated based on the deceleration deviation hG. The compensation energization amount Ig is determined to be "0" according to the calculation map Zig, when the deviation hG is in a range from the value −ho to the value ho (i.e., in the range of the dead zone). When the deviation hG is less than or equal to the predetermined value −ho, the compensation energization amount Ig is increased toward "0" with the increasing gradient Kc (variable value) as the deviation hG increases. Furthermore, when the deviation hG is greater than or equal to the predetermined value ho, the compensation energization amount Ig is increased from "0" with the increasing gradient Kc as the deviation hG increases. The predetermined value ho is a constant set in advance so as to form a dead zone for control.

The compensation energization amount calculation block IG corresponds to deceleration feedback control. In the second calculation processing example, the direct control target of the deceleration feedback control is the energization amount to the pressure adjusting valve UP. The increasing gradient Kc in the calculation map Zig is a control gain (proportional gain) in deceleration feedback control. In the calculation of the compensation energization amount Ig, either one of the differential element of the deviation hG (the differential value of the deviation hG is multiplied by the differential gain) and the integral element of the deviation hG (the integral value of the deviation hG is multiplied by the integral gain)) can be considered.

Hereinafter, processes in the control gain adjustment block KC, the target energization amount calculation block IT, and the drive circuit DR are the same as those in the first calculation processing example. In the control gain adjustment block KC, the control gain Kc is determined based on the operation flags Fa and Fm of the anti-skid control and the friction coefficient Mu. In a target energization amount calculation block IT, a final target value (target energization amount) It of the energization amount is calculated based on the instructed energization amount Ir and the compensation energization amount Ig. For example, the target energization amount It is determined by adding the instructed energization amount Ir and the compensation energization amount Ig. In the drive circuit DR, the energization amount feedback control of the pressure adjusting valve UP is executed based on the target energization amount It. That is, the drive circuit DR performs the energization amount feedback control such that the actual energization amount (detected value of the energization amount sensor IA) Ia to the pressure adjusting valve UP matches the target energization amount It.

<Process of Control Gain Adjustment Block KC>

Figure 5:
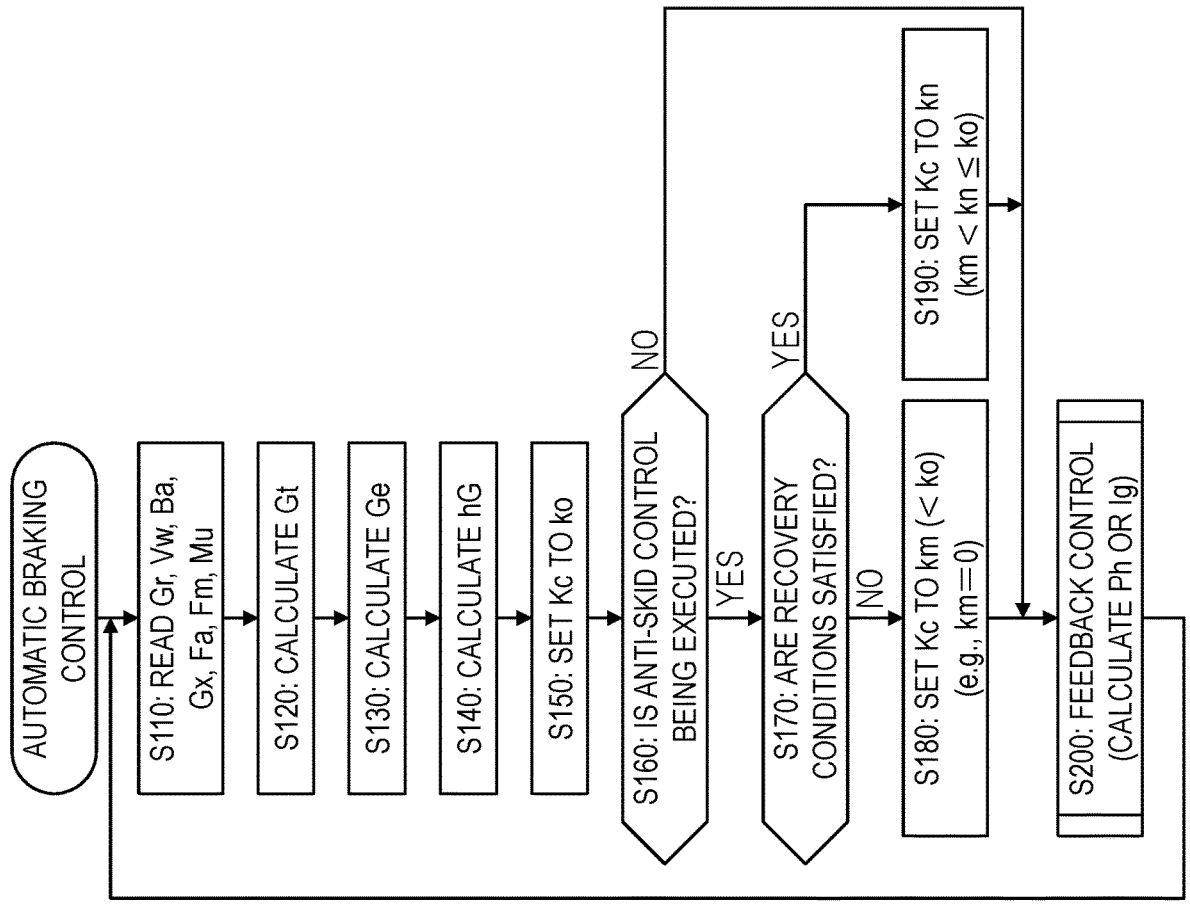
FIG. 5 is a control flow chart for explaining a calculation process of a control gain adjustment block KC.

The process of the automatic braking control (particularly, the control gain adjustment block KC) will be described with reference to the control flowchart of FIG. 5. In the control gain adjustment block KC, the control gain Kc of the deceleration feedback control is determined. This process is programmed in the braking controller ECU.

In step S110, the required deceleration Gr, the wheel speed Vw, the braking operation amount Ba, the longitudinal acceleration Gx, the operation flags Fa and Fm, and the road surface friction coefficient Mu are read. The required deceleration Gr is calculated by the driving support controller ECJ and transmitted to the braking controller ECU through the communication bus BS. The wheel speed Vw, the braking operation amount Ba, and the longitudinal acceleration (longitudinal deceleration) Gx are detected by the wheel speed sensor VW, the braking operation amount sensor BA, and the longitudinal acceleration sensor GX, and are input to the controller ECU. The operation flags Fa and Fm and the road surface friction coefficient Mu are calculated by an anti-skid control block AC in the controller ECU. As the road surface friction coefficient Mu, a value calculated by another controller or the like through a known method can be used.

In step S120, the target deceleration Gt is calculated based on the required deceleration Gr and the instructed deceleration Gs (see the process of the target deceleration calculation block GT). In step S130, the actual deceleration Ge is calculated based on at least one of the vehicle body speed Vx and the longitudinal acceleration Gx (see the process of the actual deceleration calculation block GE). In step S140, a deviation hG (=Gt−Ge) between the target deceleration Gt and the actual deceleration Ge is calculated (see the process of the automatic braking control block JC).

In step S150, the control gain Kc is set to a predetermined value ko. Here, the predetermined value ko is an initial value (nominal value) corresponding to a case where the anti-skid control is not performed. The initial value ko is a constant of a relatively large value set in advance.

In step S160, "whether or not the anti-skid control is being executed" is determined based on the operation flag Fa. The operation flag Fa is an operation flag calculated by the anti-skid control block AC. When "Fa=0" and the anti-skid control is not being executed, negative determination is made in step S160 and the process proceeds to step S200. On the other hand, when "Fa=1" and the anti-skid control is being executed, affirmative determination is made in step S160 and the process proceeds to step S170.

In step S170, "whether or not the recovery condition of the control gain Kc is satisfied" is determined based on the operation flag Fm, the target deceleration Gt, and the friction coefficient Mu. When the anti-skid control is being executed, the control gain Kc is reduced from the initial value ko. When the recovery condition is satisfied, the reduced control gain Kc is increased. Details of the recovery condition will be described later. When the recovery condition is not satisfied and negative determination is made in step S170, the process proceeds to step S180. On the other hand, when the recovery condition is satisfied and affirmative determination is made in step S170, the process proceeds to step S190.

In step S180, the control gain Kc is set to a first predetermined value km. The first predetermined value km is a preset constant corresponding to a case where the anti-skid control is executed. The predetermined value km is a value relatively smaller than the initial value ko. For example, the predetermined value km can be set to "0". In the case of "km=0", the deceleration feedback control is prohibited and is not executed (that is, the open loop control is performed).

In step S190, the control gain Kc is set to a second predetermined value kn. The second predetermined value kn is also a preset constant corresponding to the case where the anti-skid control is executed. The second predetermined value kn is less than or equal to the initial value ko, but is a value relatively larger than the first predetermined value km. That is, each control gain has a relationship of "km<kn≤ko". For example, the second predetermined value kn can be set to equal the nominal value (initial value) ko. In the case of "kn=ko", even when the anti-skid control is executed, the same deceleration feedback control as when the anti-skid control is not executed is executed.

In step S200, deceleration feedback control is executed based on the set control gain Kc (see the process of the automatic braking control block JC). Specifically, the compensation fluid pressure Ph is calculated based on the deceleration deviation hG and the control gain Kc. The target energization amount It is ultimately calculated based on the compensation fluid pressure Ph, and the pressure adjusting valve UP is controlled such that the actual energization amount Ia approaches the target energization amount It (see FIG. 3). Furthermore, the compensation energization amount Ig is calculated based on the deviation hG and the control gain Kc. The target energization amount It is determined based on the compensation energization amount Ig, and the pressure adjusting valve UP is controlled such that the actual energization amount Ia approaches the target energization amount It (see FIG. 4).

<<Recovery Condition>>

The recovery condition of step S170 will be described.

In order to suppress the mutual interference between the automatic braking control and the anti-skid control, when the anti-skid control is being executed, the control gain Kc of the feedback control of the automatic braking control is reduced from the nominal value ko at normal times to a first predetermined value km. The effect of the deceleration feedback control is reduced and control interference is avoided, but control accuracy lowers. When the execution of the anti-skid control is terminated, the control gain Kc is returned to the original nominal value ko. During the execution of the anti-skid control, it is determined based on the recovery condition that "the grip of the wheel WH is recovered and the wheel slip is returning to the original state". This is based on the fact that when the wheel slip starts to decrease, control interference hardly occurs even if the control gain Kc is increased from the first predetermined value km.

In the feasibility determination according to the recovery condition, "whether or not the control modes of the four wheels WH are all in the increasing mode Mz state (four-wheel increasing mode state), and the duration Tk of such state is larger than or equal to a predetermined time tk" is determined based on the operation flag Fm. Here, the predetermined time (threshold value) tk is a preset constant (predetermined value) for determining whether possible or not. The relevant condition is referred to as a "reference condition" of the recovery condition.

In the reference condition, when at least one of the four wheels WH is in the decrease mode Mg ("Fm=0"), the recovery condition is negated. Furthermore, even in the case of the increasing mode Mz of all the wheels WH (in the case of "Fm=1"), if the duration Tk of the four-wheel increasing mode state is less than the predetermined time tk, the recovery condition is negated. The duration Tk is counted by the timer starting from the time point when the four-wheel increasing mode state is determined for the first time (the corresponding calculation cycle, time point when the operation flag Fm is transitioned from "0" to "1"). If the four-wheel increasing mode state is negated (i.e., the operation flag Fm is transitioned from "1" to "0") before the duration Tk reaches the predetermined time tk, the duration Tk is returned to "0".

In determining whether the recovery condition is possible, the following condition is considered in addition to the above-described reference condition. Condition 1: Whether or not the road surface friction coefficient Mu is greater than or equal to a predetermined coefficient mu. Here, the predetermined coefficient (predetermined value) mu is a preset constant for determination.

When the above-described reference condition is satisfied, the recovery condition is affirmed if the friction coefficient Mu is greater than or equal to the predetermined value mu. However, even if the reference condition is satisfied, the recovery condition is negated if the friction coefficient Mu is less than the predetermined value mu. This is because when the road surface friction coefficient Mu is low, the probability the grip will be lost again is high even in a situation where the grip of the wheel WH is being recovered. As the friction coefficient Mu, a friction coefficient Mu calculated by another controller other than the one calculated by the anti-skid control block AC can be used.

Condition 2: Whether or not the target deceleration Gt is greater than or equal to a predetermined deceleration gt. Here, the predetermined deceleration gt is a preset constant for determination.

When the above-described reference condition is satisfied, the recovery condition is affirmed if the target deceleration Gt is greater than or equal to the predetermined deceleration gt. However, even if the reference condition is satisfied, the recovery condition is negated if the target deceleration Gt is less than the predetermined deceleration gt. This is because when the target deceleration Gt is relatively small, the effect of the deceleration feedback control is hardly required. In this case, the control interference can be reliably suppressed as the control gain Kc is kept at the first predetermined value km.

At least one of the condition 1 and the condition 2 may be omitted. That is, among the four conditions of "reference condition only", "reference condition+condition 1", "reference condition+condition 2", and "reference condition+condition 1+condition 2", one of the conditions is adopted as the recovery condition of step S170.

In a normal automatic braking control, "Kc=ko" is set, and the deceleration feedback control is executed so that the actual deceleration Ge approaches the target deceleration Gt. When the anti-skid control is executed, "Kc=km (<ko)" is set, and the control gain Kc is reduced (or set to "0"). Thus, the effect of the deceleration feedback control is reduced (or the deceleration feedback control is prohibited). As a result, interference between the anti-skid control and the automatic braking control can be suppressed.

Furthermore, the recovery condition is set based on the increasing mode Mz of the wheel WH. When the recovery condition is satisfied, the control gain Kc is increased from the first predetermined value km to the second predetermined value kn (≤ko). As a result, the effect of the deceleration feedback control is increased, and the control accuracy of the automatic braking control is improved (or restored). To smoothly change (increase) the effect of the feedback control, the control gain Kc can be gradually increased from the first predetermined value km to the second predetermined value kn with the time change amount limited to a predetermined value from the time point (calculation cycle) the recovery condition is satisfied for the first time.

<Second Embodiment of Braking Control Device SC>

Figure 6:
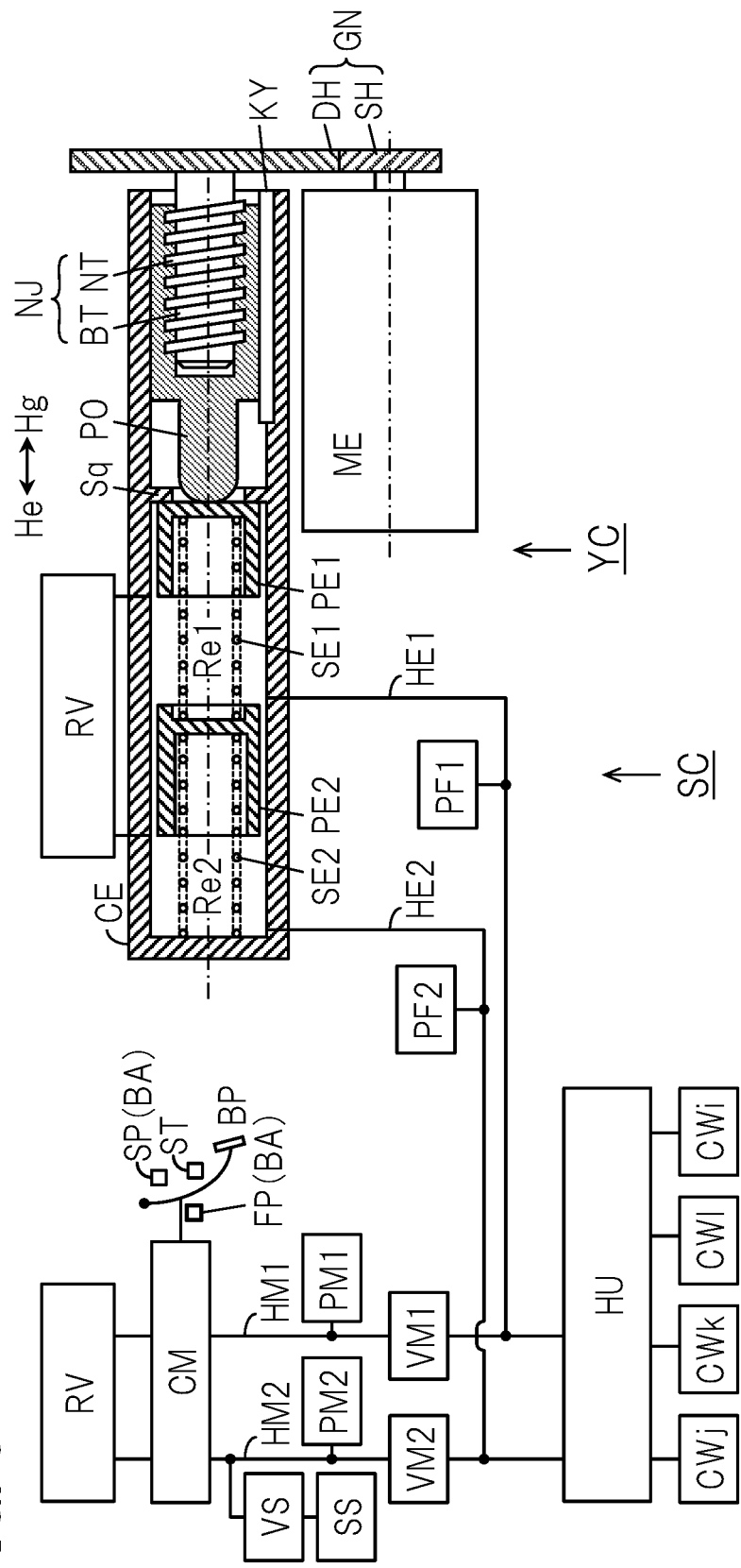
FIG. 6 is a schematic view for describing a second embodiment of a vehicle braking control device SC according to the present invention.

A second embodiment of a vehicle braking control device SC will be described with reference to the schematic view of FIG. 6. In the second embodiment, the braking control device SC is a so-called brake-by-wire type. The anti-skid control is achieved by the electromagnetic valves VI and VO of the fluid unit HU, while the automatic braking control is achieved by the electric motor (pressure adjusting motor) ME of the pressure adjusting unit YC.

As described above, configuring members, calculation processes, signals, characteristics, and values denoted by the same symbols are of the same function. In the subscripts "i" to "l" at the end of various symbols, "i" indicates a right front wheel, "j" indicates a left front wheel, "k" indicates a right rear wheel, and "l" indicates a left rear wheel. Furthermore, the subscripts "i" to "l" at the end of the symbols can be omitted. In this case, each symbol represents a generic name for each of the four wheels. In addition, the subscripts "1" and "2" added to the end of various symbols indicate the two braking systems, where "1" indicates the first system, and "2" indicates the second system. The subscripts "1" and "2" at the end of the symbols can be omitted. In this case, each symbol represents a generic name of each of the two braking systems.

The braking control device SC includes a master cylinder valve VM, a simulator valve VS, a simulator SS, a master cylinder fluid pressure sensor PM, a fluid unit HU, a pressure adjusting unit YC, and an adjusted fluid pressure sensor PF.

The master cylinder valve VM is provided in the master cylinder fluid passage HM connected to the master cylinder CM. The master cylinder valve VM is a normally-open type on/off electromagnetic valve. At the time of braking, the master cylinder valve VM is set to the closed position, and the connection between the master cylinder CM and the wheel cylinder CW is cut off.

The simulator SS is provided to generate an operation force Fp on the brake operation member BP at the time of braking. Furthermore, the simulator valve VS is provided so that the brake fluid BF is not consumed by the simulator SS when the braking control device SC is malfunctioning. The simulator valve VS is a normally-closed type on/off electromagnetic valve. At the time of braking, the simulator valve VS is set to the open position, and the master cylinder CM is in communication with the simulator SS. The master cylinder fluid pressure sensor PM is provided to detect the fluid pressure Pm of the master cylinder CM. The master cylinder fluid pressure sensor PM is one of the braking operation amount sensors BA. The master cylinder fluid passage HM is connected to the fluid unit HU as in the first embodiment. The fluid unit HU includes an inlet valve VI, an outlet valve VO, and an electric motor ML. The anti-skid control is thereby executed.

The pressure adjusting unit YC is provided to adjust the adjusted fluid pressure Pf (=Pw) instead of the fluid pressure Pm from the master cylinder CM by the driver. The pressure adjusting unit YC is called a so-called "electric cylinder". The pressure adjusting unit YC is configured by an electric motor ME for pressure adjustment, a speed reducer GN, a rotation/linear movement conversion mechanism (screw mechanism)) NJ, a pressing member PO, a pressure adjusting cylinder CE, a pressure adjusting piston PE, and a return spring SE.

The electric motor (pressure adjusting motor) ME is a power source for the pressure adjusting unit YC to adjust (increase/decrease) the brake fluid pressure Pw. The pressure adjusting motor ME is driven by the controller ECU. For example, a brushless motor can be adopted as the pressure adjusting motor ME.

The speed reducer GN is configured by a smaller-diameter gear SK and a larger-diameter gear DK. The rotational power of the electric motor ME is reduced by the speed reducer GN and transmitted to the screw mechanism NJ. In the screw mechanism NJ, the rotational power of the speed reducer GN is converted into the linear power of the pressing member PO. The nut member NT is fixed to the pressing member PO. The bolt member BT of the screw mechanism NJ is fixed coaxially with the larger-diameter gear DK. Since the rotational motion of the nut member NT is restricted by the key member KY, the rotation of the larger-diameter gear DK causes the nut member NT screwed with the bolt member BT to move in the direction of the rotation axis of the larger-diameter gear DK. The pressure adjusting piston PE is moved by the pressing member PO. The pressure adjusting piston PE is inserted into an inner hole of the pressure adjusting cylinder CE, and a combination of the piston and the cylinder is formed. A fluid pressure chamber (pressure adjusting cylinder chamber) Re defined by the pressure adjusting cylinder CE and the pressure adjusting piston PE is formed. The return spring (compression spring) SE is provided in the pressure adjusting cylinder chamber Re. A stopper Sq is provided inside the pressure adjusting cylinder CE, and when the output of the pressure adjusting motor ME is "0", the pressure adjusting piston PE is pressed by the return spring SE to a position where it abuts against the stopper Sq.

The pressure adjusting cylinder chamber Re is connected to the pressure adjusting fluid passage HE. The pressure adjusting fluid passage HE is connected to the master cylinder fluid passage HM downstream of the master cylinder valve VM. When the pressure adjusting piston PE is moved in the center axis direction, the volume of the pressure adjusting cylinder chamber Re changes, and the adjusted fluid pressure Pf is adjusted. Specifically, when the pressure adjusting motor ME is rotationally driven in the forward rotating direction, the pressure adjusting piston PE is moved in the advancing direction He, and the adjusted fluid pressure Pf is increased. On the other hand, when the pressure adjusting motor ME is rotationally driven in the reverse rotating direction, the pressure adjusting piston PE is moved in the retreating direction Hg, and the adjusted fluid pressure Pf is reduced. The adjusted fluid pressure Pf is adjusted (increased/decreased) by adjusting the energization amount to the pressure adjusting motor ME. An adjusted fluid pressure sensor PF is provided in the pressure adjusting fluid passage HE so as to detect the adjusted fluid pressure Pf.

The brake fluid pressure Pw is increased or decreased by the increase or decrease of the adjusted fluid pressure Pf, and the braking torque Tq of the wheel WH is increased or decreased (adjusted). When the adjusted fluid pressure Pf increases, the force with which the friction material is pressed against the rotating member KT increases, and the braking torque Tq increases. As a result, the braking force of the wheel WH is increased. On the other hand, when the adjusted fluid pressure Pf decreases, the pressing force of the friction material on the rotating member KT decreases, and the braking torque Tq decreases. As a result, the braking force of the wheel WH is reduced.

In the second embodiment, the automatic braking control is realized by the pressure adjusting unit YC. That is, the fluid unit HU is not used for automatic braking control. Therefore, in the second embodiment, the output fluid pressure Pf of the pressure adjusting unit YC is the direct control target of the deceleration feedback control. In this case, similarly to the first processing example of the automatic braking control block JC, the target value of the adjusted fluid pressure Pf is determined based on the calculation map including the deceleration deviation hG and the control gain Kc. Then, the feedback control is executed so that the adjusted fluid pressure Pf (the detected value of the adjusted fluid pressure sensor PF) matches the target value.

The energization amount (supply current) to the electric motor ME is substantially proportional to the output of the electric motor ME. Thus, the energization amount to the electric motor ME may be the direct control target of the deceleration feedback control. In this case, similarly to the second processing example of the automatic braking control block JC, the target energization amount to the electric motor ME is determined based on the calculation map including the deceleration deviation hG and the control gain Kc. Then, the feedback control is executed such that the actual energization amount of the electric motor ME matches the target energization amount.

The second embodiment also has the same effects as the first embodiment. The control gain Kc is appropriately adjusted based on the operation flags Fa and Fm, the friction coefficient Mu, and the target deceleration Gt. Thus, mutual interference between the automatic braking control and the anti-skid control can be suppressed. In addition, when the deceleration slip is recovering, the control gain Kc is increased before the anti-skid control is terminated based on the recovery condition. The effect of the feedback control is thus appropriately adjusted, and the control accuracy of the automatic braking control can be secured.

<Third Embodiment of the Braking Control Device SC>

Figure 7:
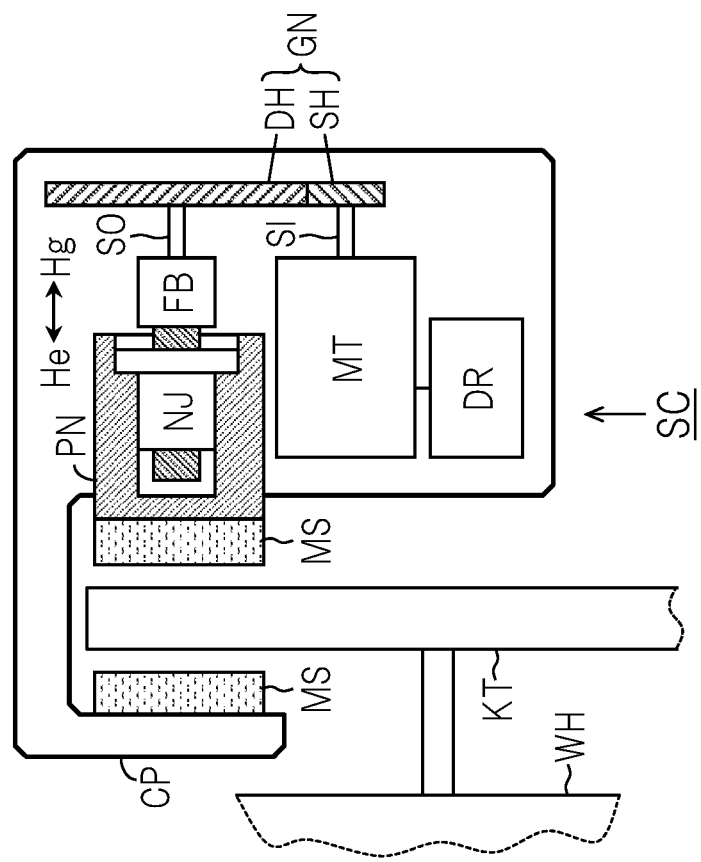
FIG. 7 is a schematic view for describing a third embodiment of a vehicle braking control device SC according to the present invention.

A third embodiment of a vehicle braking control device SC will be described with reference to FIG. 7. In the first and second embodiments, the brake fluid pressure Pw is used for adjusting the braking torque Tq. In the third embodiment, no fluid is used for adjusting the braking torque Tq. Therefore, the anti-skid control and the automatic braking control are realized by adjusting the rotating direction and the output of the electric motor MT. This configuration is called a so-called "EMB (electro-mechanical brake)".

The braking control device SC according to the third embodiment includes an electric motor MT, a speed reducer GN, a screw mechanism NJ, a pressing piston PN, and a pressing force sensor FB. The braking control device SC is formed in the brake caliper CP. A braking control device SC is provided instead of the wheel cylinder CW in the first and second embodiments.

The electric motor (wheel motor) MT is a power source for adjusting (increasing/decreasing) the force Fb at which the friction member MS presses the rotating member KT. The electric motor MT is driven by the controller ECU. For example, a brushless motor is adopted as the electric motor MT.

The speed reducer GN is configured by a smaller-diameter gear SK and a larger-diameter gear DK. The rotational power of the electric motor MT is reduced by the speed reducer GN and transmitted to the screw mechanism NJ. In the screw mechanism NJ, the rotational power of the speed reducer GN is converted into the linear power of the pressing piston PN. A nut member NT is fixed to the pressing piston PN. The bolt member BT of the screw mechanism NJ is fixed coaxially with the larger-diameter gear DK. Since the rotational movement of the nut member NT is restricted by the key member KY, the rotation of the larger-diameter gear DK causes the nut member NT screwed with the bolt member BT to move in the direction of the rotation axis of the larger-diameter gear DK, and the relative distance between the pressing piston PN and the rotating member KT is adjusted.

A friction member MS is fixed to the pressing piston PN. The braking torque Tq is adjusted by adjusting the rotating direction and output of the electric motor MT. When the electric motor MT is driven in the forward rotating direction, the pressing piston PN is moved in the advancing direction He, and the force Fb at which the friction member MS presses the rotating member KT is increased. The increase in the pressing force Fb increases the braking torque Tq and increases the braking force of the wheel WH. On the other hand, when the electric motor MT is rotationally driven in the reverse rotating direction, the pressing piston PN is moved in the retreating direction Hg, and the pressing force Fb is reduced. The decrease in the pressing force Fb decreases the braking torque Tq and decreases the braking force of the wheel WH. The braking control device SC is provided with a pressing force sensor FB to detect the pressing force Fb.

The pressing force Fb is the direct control target of the deceleration feedback control. In this case, a target value (target pressing force) corresponding to the pressing force Fb is determined based on a calculation map including the deceleration deviation hG and the control gain Kc. Then, the feedback control is executed so that the pressing force Fb (detected value of the pressing force sensor FB) matches the target pressing force.

The energization amount (supply current) to the electric motor MT is substantially proportional to the output of the electric motor MT. Thus, the energization amount to the electric motor MT may be the direct control target of the deceleration feedback control. In this case, the target energization amount to the electric motor MT is determined based on a calculation map including the deceleration deviation hG and the control gain Kc. Then, the feedback control is executed such that the actual energization amount of the electric motor MT matches the target energization amount.

The third embodiment also has the same effects as the first and second embodiments. Control interference can be suppressed by appropriately adjusting the control gain Kc. When the wheel grip tends to be recovering, the control gain Kc is increased before the anti-skid control is terminated, so that the effect of the feedback control can be appropriately adjusted.

<Operation/Effect>

In the controller ECU, the automatic braking control that adjusts the braking torque Tq is executed based on the target deceleration value Gt determined according to the relative distance Ob between the object in front of the vehicle and the relevant vehicle. In the automatic braking control, an actual deceleration value Ge corresponding to the target deceleration value Gt is calculated. Then, based on the target deceleration value Gt and the actual deceleration value Ge, the feedback control (processes of the calculation blocks PH and IG) is executed so that the actual deceleration value Ge approaches the target deceleration value Gt. That is, the braking torque Tq is adjusted so as to reach the target deceleration value Gt by the feedback control related to the deceleration of the vehicle.

Furthermore, in the controller ECU, the anti-skid control that adjusts the braking torque Tq and suppresses the excessive slip Sw of the wheel WH is executed based on the speed Vw of the wheel WH. When the anti-skid control is executed (i.e., when "Fa=1"), the control gain Kc of the feedback control is reduced. For example, when the anti-skid control is executed, the control gain Kc is adjusted to "0", and the execution of the feedback control is prohibited. That is, the automatic braking control is set to the open loop control. In the automatic braking control, the effect of the feedback control is adjusted by the control gain Kc. During the execution of the anti-skid control, the control gain Kc is reduced from the initial value ko to the first predetermined value km, and its effect is weakened. Therefore, mutual interference between the two controls can be suppressed.

In the controller ECU, either one of a decrease mode Mg for decreasing the braking torque Tq and an increasing mode Mz for increasing the braking torque Tq is determined based on the speed Vw in the anti-skid control. The control gain Kc is increased at a time point the time Tk during which the increasing mode Mz is continuously determined for all the wheels WH exceeds the threshold time tk under a situation where the control gain Kc of the feedback control is decreasing. For example, the control gain Kc is returned to the value of non-execution of the anti-skid control (initial value ko). When the above condition (recovery condition) is satisfied, the wheel grip tends to be recovering, and control interference is less likely to occur. Therefore, the control gain Kc is increased, and the effect of the automatic braking control can be enhanced.

"Whether or not the road surface friction coefficient Mu is greater than or equal to a predetermined value mu" is determined, and when "Mu≥mu", the increase of the control gain Kc is permitted. On the other hand, when "Mu<mu", the increase of the control gain Kc is prohibited. When the road surface friction coefficient Mu is low, there is a high possibility that the wheel grip will be lost, and the control gain Kc may be repeatedly increased and decreased. In order to avoid the complicatedness of the control, the control gain Kc can be increased only when the friction coefficient Mu is greater than or equal to a predetermined value mu.

"Whether or not the target deceleration Gt is greater than or equal to a predetermined acceleration gt" is determined, and when "Gt≥gt", the increase of the control gain Kc is permitted. On the other hand, when "Gt<gt", the increase of the control gain Kc is prohibited. When the target deceleration Gt is small, the effect of the deceleration feedback control is not required. In this case, the complicatedness of the control is taken into consideration, and the control gain Kc is kept reduced to the first predetermined value km and is not increased.

In at least one of a case where the control gain Kc is decreased and/or a case where the control gain Kc is increased, the control gain Kc may be gradually changed (corrected). For example, the decreasing gradient of the control gain Kc is limited to a predetermined gradient (predetermined value) kg set in advance. Furthermore, the increasing gradient of the control gain Kc is limited to a predetermined gradient (predetermined value) kz set in advance. Thus, in the feedback control of the automatic braking control, a smooth gain adjustment can be performed.

Other Embodiments

Other embodiments will be described below. Other embodiments also have the same effects as above.

In the embodiments described above, the linear type pressure adjusting valve UP is used in which the valve opening amount is adjusted in accordance with the energization amount. For example, the pressure adjusting valve UP is an on/off valve (a two-position switching type electromagnetic valve), but may be a valve in which the opening and closing of the valve is controlled by a duty ratio and the fluid pressure is linearly controlled.

In the embodiments described above, the required value (required deceleration Gr) is transmitted from the driving support controller ECJ to the braking controller ECU in the dimension of acceleration. Alternatively, the required value may be transmitted in the dimension of speed. Specifically, in the driving support controller ECJ, the required speed Vr is calculated, which is then transmitted via the communication bus BS. In the braking controller ECU, the required speed Vr can be converted into specifications of the acceleration, and the required deceleration Gr can be calculated.

The driving support controller ECJ and the braking controller ECU can be integrated. In this case, the processes of the controller ECJ are included in the controller ECU, and the relative distance sensor OB is connected to the controller ECU.

In the embodiments described above, the configuration of the disc type braking device (disc brake) has been exemplified. In this case, the friction member is a brake pad and the rotating member is a brake disc. Instead of the disc type braking device, a drum type braking device (drum brake) can be adopted. In a case where a drum brake is adopted, a brake drum is adopted in place of the caliper. The friction member is a brake shoe, and the rotating member is a brake drum.

In the embodiments described above, a diagonal fluid passage is exemplified as the two-system fluid passage. Instead, a front-back type (also referred to as "H-type") configuration may be adopted. In the front-back type fluid passage, the wheel cylinders CWi and CWj for the front wheels are fluidly connected to the first master cylinder fluid passage HM1 (i.e., the first system). In addition, the wheel cylinders CWk, CWl for the rear wheels are fluidly connected to the second master cylinder fluid passage HM2 (i.e., the second system).

The invention claimed is:

1. A vehicle braking control device that applies a braking torque to wheels of the vehicle, the braking control device comprising:
   a controller that executes
      an automatic braking control for executing a feedforward control and a feedback control to adjust the braking torque based on a target deceleration value of the vehicle corresponding to a distance between an object in front of the vehicle and the vehicle, and
      an anti-skid control for adjusting the braking torque based on a speed of the wheels to suppress excessive slip of the wheels, wherein
   the controller is configured to
      calculate an actual deceleration value corresponding to the target deceleration value,
      execute the feedforward control based on the target deceleration value and the feedback control based on the target deceleration value and the actual deceleration value to bring the actual deceleration value closer to the target deceleration value, and
      prohibit the execution of the feedback control when the anti-skid control is executed.

2. The vehicle braking control device according to claim 1, wherein
   the controller is configured to determine either one of a decrease mode for decreasing the braking torque and an increasing mode for increasing the braking torque based on the speed in the anti-skid control, and to, in a state in which the feedback control has been prohibited, resume the execution of the feedback control at a time point in which the increasing mode has been continuously determined for all the wheels for a predetermined time.

* * * * *